June 24, 1952
M. B. HEFTLER
2,601,521
FILTER
Filed Sept. 19, 1947
2 SHEETS—SHEET 1
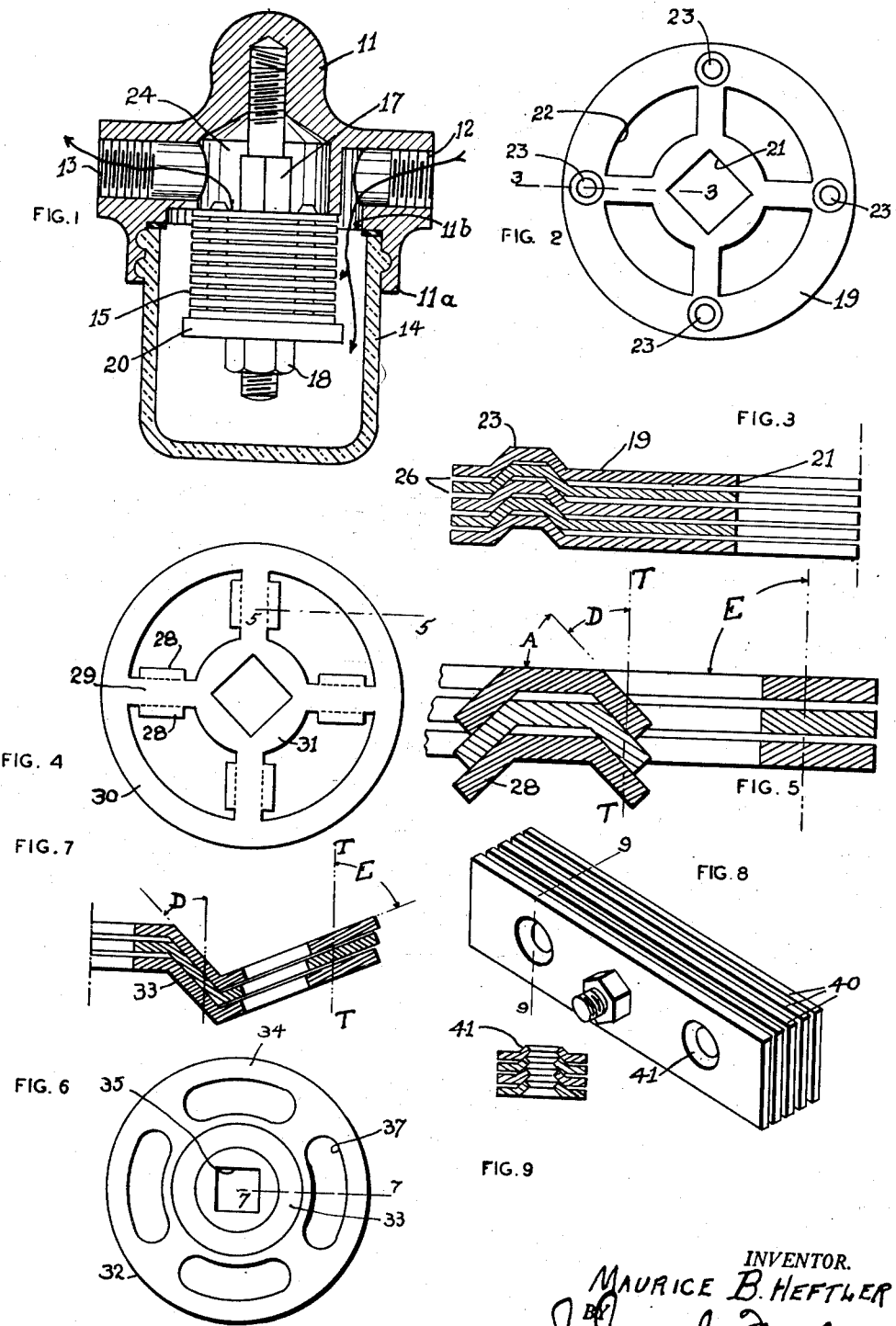
INVENTOR.
MAURICE B. HEFTLER
BY Joseph Farley
ATTORNEY June 24, 1952  M. B. HEFTLER  2,601,521
FILTER
Filed Sept. 19, 1947  2 SHEETS—SHEET 2
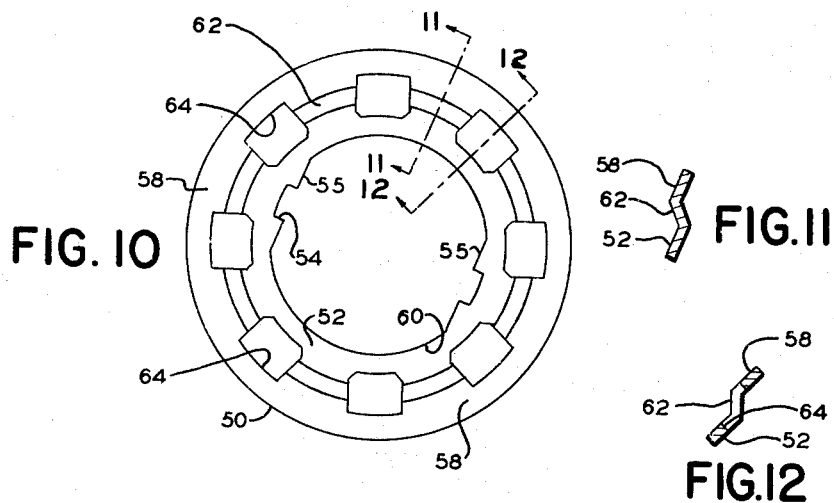
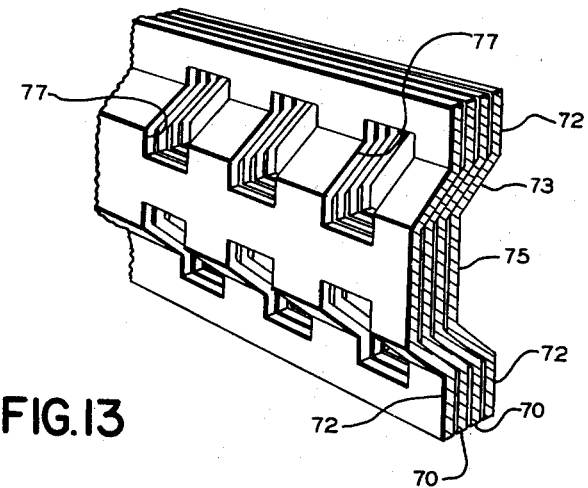
INVENTOR
Maurice B. Heftler Patented June 24, 1952

2,601,521

UNITED STATES PATENT OFFICE 2,601,521

FILTER

Maurice B. Heftler, Grosse Pointe Park, Mich.

Application September 19, 1947, Serial No. 774,920

4 Claims. (Cl. 210—169)

This invention relates to improved arrangements to limit or determine the spacing between overlying layers or sheets in various arrangements and in various applications and especially when they are to be closely and uniformly spaced or when it is desired to have a very simple spacing means integral with the several layers.

This application is a continuation in part of abandoned application 583,601, filed March 19, 1945, which itself was a continuation in part of abandoned application 454,179, filed August 8, 1942.

This invention also relates to filters and more particularly to edge type filters, a type that has come into extensive use, and which is characterized by the fact that the passages through which the liquid passes for separating the foreign matter therefrom are between two adjacent and usually parallel layers or sheets of a material (such as metal) which thus present their edges to the direction of the flow. Such layers or sheets are often arranged in closely spaced and juxtaposed relationship.

In its broader aspects, the objects of this invention are to provide an arrangement for an improved means (preferably integral) to predetermine or limit the generally uniform spacing of layers, particularly where such layers are quite thin and uniform and where the spacing is even less than the layer thickness.

Other and more specific objects are to provide an improved construction for edge filters and their spacing means which will give the minimum deformation of the filtering layers for a given width of slot and filtering area, in which the several layers may be identical and easily and cheaply manufactured, and in which a high degree of accuracy and uniformity may be achieved commercially. The objects also include the forming of such filter layers with their spacing means with a minimum deformation of the material thereof and the predetermining of said spacing by the layer thickness and by the angle of a deformed portion.

This invention also has for its objects the making of an edge filter of the type in which the spacing means are integral with the material of the layers or elements which form the edges of the filtering slits, but which, as compared with the types of construction disclosed by the prior art, can be made of relatively thin material, such as sheet metal, by a simple stamping operation so as to effect a saving in material cost; and/or in such a manner to obtain a filtering slit which may be as narrow as desired and materially narrower than the layer thickness if desired; and/or to obtain a greater effective filtering area.

Principal objects of the invention, therefore, are to provide a simpler, sturdier, and cheaper construction for filters of the edge type, which also increases the fineness of the filtering slits for a given layer thickness.

Other and more specific objects of the invention will be apparent from the following description and claims which will be understood by reference to the accompanying drawings, wherein, Fig. 1 is a sectional view of a filter illustrating one form of application of my invention;

Fig. 2 is a plan view of one of the elements employed in the construction illustrated in Fig. 1;

Fig. 3 is an enlarged sectional fragmentary view, taken in a plane corresponding with the line 3—3 of Fig. 2, and showing several elements in the position they assume when assembled;

Fig. 4 is a plan view of another form of construction of the filtering element;

Fig. 5 is an enlarged sectional fragmentary view of a portion of a stack of elements, like those illustrated in Fig. 4, and taken in a plane corresponding with the line 5—5 thereof;

Fig. 6 is a plan view of a filtering element illustrating another form of the invention;

Fig. 7 is an enlarged fragmentary sectional view of a portion of a stack of elements like that illustrated in Fig. 6, and taken in a plane as indicated by the line 7—7 thereof;

Fig. 8 is a perspective view of a fourth form of the invention;

Fig. 9 is a sectional view of Fig. 8 taken in a plane indicated by the line 9—9 thereof;

Fig. 10 is a plan view of a fifth and preferred form of the invention;

Fig. 11 is a sectional view taken in a plane shown by 11—11 in Fig. 10; and

Fig. 12 is a sectional view taken in a plane shown by 12—12 in Fig. 10; and

Fig. 13 is a perspective view taken of a section through a stack of layers forming a sixth embodiment of the invention.

Referring now to Fig. 1 wherein there is illustrated one application of my invention, a head 11 is provided with an inlet 12 and an outlet 13, preferably screw threaded for connection with pipes for conducting fluid to and from the filter. The head 11 is provided with a depending annular flange 11a internally threaded for the reception of a bowl 14, preferably of glass or other transparent material. Fluid entering the inlet 12 passes to the interior of the bowl 14 through 11b. Mounted within the bowl 14 is a stack 15 of filtering elements which are held in assembled and operative relation upon a non-circular stem 17 by a nut 18 screwed on one end of said stem, the other end of which is screw threaded into the head 11 to hold the stack in concentrically spaced relation to the bowl 14 and with the bottom of the stack some distance from the bottom of the bowl thereby to permit free access of the fluid to the whole outer surface of the filter stack.

The filter stack 15 is made up of a number of substantially identical disclike elements 19, such as those illustrated in Figs. 2 and 3, stacked one upon another, such elements in turn being supported on a thick washer 20 which is imperforate except for an opening through which the threaded lower end of the stem 17 passes. As shown in Fig. 2, each of the elements 19 is provided with a non-circular aperture 21 to fit and receive the stem 17 and with a plurality of arcuate perforations 22 bounded by an outer annular band or rim extending entirely around the outer portion of each disclike element. Each element has formed in it small frusto-conical bosses 23 preferably formed in the said outer annular band.

When the filtering elements 19 are stacked, the frusto-conical bosses are arranged in engagement as shown in Fig. 3, from an examination of which it will be apparent that the adjacent flat surfaces of each pair of elements are spaced from each other so as to form restricted passages 26. The spacing and arrangement of the arcuate perforations 22 and projections 23 is such that when the discs are stacked as shown the perforations 22 are in registering alignment to provide a plurality of longitudinally extending passages through the stack.

Nut 18 keeps the elements in this assembled relationship against axial displacement. It is not essential that the stem 17 be of non-circular cross section to prevent an angular displacement of the elements, as the nesting of the bosses is quite sufficient for this purpose, however, this provision of a non-circular stem 17 cooperating with a complementary hole 21 is a great convenience in assembling.

The manner in which the filter operates is in accordance with the usual operation of edge filters, when the stacked discs or elements are assembled as shown in Fig. 1 and fluid to be filtered is admitted through inlet 12, the fluid flowing through passage 11b fills the interior of the bowl 14. The fluid will then flow through the restricted passages 26 between the elements to the longitudinal passages formed by the arcuate perforations 22 and thence to chamber 24 which communicates with the outlet 13. As will be apparent the stack of elements forms an efficient filtering medium that not only prevents the passage of any particle of greater thickness than the width of the restricted passages 26 but also restricts the passage of much smaller particles which tend to cling to the surfaces and edges of the discs.

From Fig. 3, it is apparent that contact between the elements will be effected only on the conical surfaces of the bosses 23 and that, as previously stated, the remainder of the elements will be separated to form restricted fluid passages, the width of each passage (the distance between the two adjacent elements 19) being proportional to the thickness of the stock or sheet material from which the discs are fabricated and depend-ing also on the angle which the sides of the frusto-conical projections form with the flat faces of the discs. Such an angle is indicated at A in the embodiment illustrated in Fig. 5. It will therefore be apparent that the width of the filtering slit 26 is independent of the height of the projection or boss 23 above the plane of the main surface of the element.

Figs. 4 and 5 illustrate another form of element to carry out the invention. In this form, the deflected portions or projections, instead of being of frusto-conical form, are formed by inclined surfaces made by bending down a plurality of small tabs 28 on the sides of the arms 29 that connect the outer rim 30 with the hub or central portion 31 of the disc. Fig. 5 illustrates that when the discs of this type are stacked with the deflected tabs of one disc nested within the deflected tabs of the next adjacent disc, the discs are spaced from each other in a manner identical with the one shown in Fig. 3 and so as to form restricted fluid passages between the adjacent surfaces of each pair of discs.

In Figs. 6 and 7 another form of filtering element embodying my invention is illustrated. In this form, the rim portion 34 of each element 32 is deflected to form the frustum of a cone with its large base up and the nesting portion 33 is also in the form of a frustum of a cone but opening in the other direction and the small base of which forms a flat hub having a non-circular opening 35 to receive a stem such as 17. Spaced arcuate shaped openings 37 are provided in the rim portion 34 so that, when such elements are stacked, they will be so guided by the non-circular hole 35 and stem 17 that apertures 37 will be in register to form longitudinal channels.

With the slopes of the two frusta 33 and 34 as shown, it will be apparent from Fig. 7, that, when the elements are stacked, the frusta 33 will nest while the rim portions 34 are kept separated to form narrow restricted fluid passages therebetween, through which the fluid to be filtered may pass to the channels made by registering apertures 37 and thence to the outlet of the filter.

In Figs. 8 and 9 another form of filtering stack is illustrated which would be useful in an assembly of a type different from that illustrated in Fig. 1. In this embodiment, the elements take the form of long rectangular pieces 40, preferably of sheet metal, each element being provided with frusto-conical projections 41. Any number of such elements may be assembled so that the projections 41 nest within one another as shown in Fig. 9, any suitable means being used to maintain them in assembled relationship.

Only a few elements are shown in Fig. 8, but it will be understood that a much larger number of elements can readily be assembled in this manner so as to form a foraminous partition which may be used to separate two cavities, not shown, yet to permit the passage of clean fluid from one side of the partition to the other while preventing the passage of foreign matter larger than the laminar passages existing between adjacent elements.

Generically speaking, a preferred edge filter embodying my invention comprises a stack of substantially identical layers of one piece or as separate elements having portions of their surfaces deformed or deflected, said deflected portions of one element being in nested cooperative relation and preferably in contact with the deflected portions of adjacent elements and cooperating therewith to predetermine the minimum space between the elements so as to define a filtering slit therebetween, for the passage of fluid to the exclusion of foreign matter.

In edge filtering stacks made according to my invention, I prefer, but am not limited to arrangements in which the individual elements are not only piled or stacked in nested engagement upon one another, but are also orientated similarly, or, to use a more precise language borrowed from geometry, the position in space of any element is derived from the position of the first element of the stack by a simple translation, without rotation, the direction of such translation being indicated by line T—T in Figs. 5 and 7. The contact engagement of the deflected and nesting portions of the elements with each other determines the amount of this translation, or, in other words, the distances between homologous points of adjacent elements. If D be the angle that such deflected portion makes with the aforesaid direction T—T, then this translation is equal to $t \cosec. D$, where $t$ is the thickness of the material.

In the form of Fig. 5, where the surface adjacent to and bounded by the edge of the element is at right angles (E) to the aforesaid direction, the width of the slit is the difference between the amount of the translation and the thickness of the stock and will be given by the formula: $t (\cosec. D-1)$. As a practical example, assuming the stock to be .005" thick and the angle to be 45 degrees, the width of the slit would be .002".

In the above example, the distance between homologous points of adjacent elements is equal to the thickness of the stock out of which the element is made, which thickness is not changed in the deflected portion, divided by the sine of 45°. This distance is equal to .005" times the cosecant of 45°, which is 1.414214, and it is measured along line T—T of Figure 5. T—T is parallel to the axis of the stack of elements and each element is perpendicular to the axis, so the space left between elements is the above translation distance, .005×1.414214, less the thickness of the element.

$$.005 \times 1.414214 - .005 = .005(1.414214-1)$$
$$.005(1.414214-1) = .005 \times .414214$$
$$= .00207107''$$
$$\text{or } .002''$$

In the form of Figs. 6 and 7, as the angle E is greater than angle D, the edge portions will be kept at a distance; and in this case, the width of the slit will be given by the more general formula: $t (\cosec. D - \cosec. E)$. Assuming again that the stock is .005" thick and the angle D is 45 degrees, if angle E is assumed to be 60 degrees, the width of the slit will be .0013".

Comparing the embodiment of Figures 1 to 3 with the form of Figures 8 and 9, it is noted that the conically deformed portions 23 of the first form do not have holes or central openings and hence are to be preferred where more strength or resistance to bending is desired while the conical positions 41 with their central openings are easier to manufacture. Thus either arrangement may be employed as may be desirable.

In Figures 8 and 9 the openings through the truncated conical portions 41 may serve to receive securing screws or bolts not shown, but like the one shown in the center of Fig. 8, which bolt, serving to hold the several layers with their portions 41 in engagement, is through the central holes of an homologous set of deformed portions like 41.

The embodiment of this invention which is preferred at the present time is shown in Figures 10, 11, and 12 in which the disk-like element shown is stacked with others of identical form in similar fashion to the elements of Fig. 1. In such a stack the homologous portions are arranged in alignment as in Fig. 1.

In this preferred embodiment, each disk type element is stamped out with a circular outer rim or filtering edge 50, a relatively large concentric mostly circular central opening having an inner edge 60, flat or straight edges 55 and key receiving recesses 54. 55 and 54 hold the elements with their homologous parts in alignment by receiving similarly shaped wings or extensions on a central through bolt otherwise like 17 of Fig. 1 thus serving to also clamp the elements together.

Each element has annular inner and outer rim portions 52 and 58 respectively which lie in parallel planes and are connected by an angularly extending portion 62 which is, as shown, concentric with 60 and 50. Uniformly shaped openings 64 are spaced at equal angles to interrupt the angular portion 62 and also extend radially inward into portion 52 and radially outward into portion 58. The angular portion 62 is preferably formed as a surface of revolution and specifically as a surface of a truncated cone, of which the generating angle corresponds to the angle D of Fig. 5. Portions 62 have appreciable areas held together to predetermine the minimum spacing which is the same for parallel portions 52 and 58.

While surface or portion 62 is preferably a surface of a cone yet in view of its interruptions by openings 64, the material between the openings may also be formed as plane bends and thus not as surfaces of revolution. In fact in the actual elements, the difference is not readily apparent upon inspection.

It will be seen that the rim or filtering edge 50 is entirely unobstructed or uninterrupted and yet spacing and supporting portions 62 are located as close to this outer rim as practical to thus give a large filtering area and short lengths of unsupported material in the layers.

The openings 64, identically oriented in successive elements, collectively form channels which serve to conduct filtrate from between parallel portions 58 to between parallel portions 52. If these openings were not present, the sloping portions 62 of adjacent elements, in contact with each other over appreciable areas, would effectively block out all outlet from the stack of filtering elements.

The openings 64 reduce the restriction of the filter by reducing the length of the slit paths into the main central opening 60. Also the inner edges of these openings would also filter or catch any material which passed the outer rim if that were possible.

The openings 64 of the several elements which collectively form flow channels also serve to increase the flow capacity of the stack of filtering elements above what would be obtained from the main central opening 60 alone.

The large area central opening 60 also helps reduce the restriction of the inside return path.

In the several species above, each of the several layers is a separate piece or element. However, this is not essential to the successful practice of the present invention since all or a plurality of the several layers of an edge filter according to this invention may be of one piece or strip of sheet material (preferably thin and of uniform thickness) which may be folded or the like but preferably is wound about an axis as shown in the embodiment of Fig. 13 (wherein the slight curvature is not apparent).

Here the coil is in the form of a flat spiral whose axis is parallel to the plane of the outer edges or undeformed edge portions of the coiled strip. The several tightly coiled layers 70 each have outer edge or rim portions 72 either one of which may be the initial filtering edge or the arrangement may be such that the flow is in from each edge or rim to the uniformly spaced openings 71 which are offset to either side of the center of the strip to interrupt the inclined portions 73 (which are in contact to predetermine the minimum spacing). These openings extend into the two edge portions 72 and the central portions 75, all three of which are parallel.

The spacing portions 73 inclined to the plane of portions 72 at an angle such as D of Fig. 5 are held together by the coiling of the strip and by any suitable releasable retaining means, not shown. When wound in a spiral, the several openings 71 will not fall into exact radial alignment but will progressively be offset but the filtered fluid can flow from an edge into the adjacent openings, through the slots between portions 75 into the openings of the other side and out through the other edge slots or else similarly both edges in to the two sets of openings.

The planes of the two inclined portions 73 form a dihedral angle or what may be termed a truncated dihedral angle which is uniform throughout and also gives a seating or self centering action. Note the radially directed dihedral angular portions in Fig. 4.

The key receiving portions 54 are used to angularly align the disks in the same way in which they were stamped to thus distribute the unavoidable small errors which do not fall in the same way.

The large central opening permits a large and thus amply stiff central rod or bolt and also permits the use of a larger and stiffer rod-like member for assembly during manufacture which is an advantage.

During stamping of this form the outer rim is not changed in thickness but the necessary draw in the cupping produces a very slight reduction in thickness in the inner rim which is not ordinarily used as the initial filtering edge.

In all of the embodiments shown the several layers may be made of any suitable sheet material having sufficient strength including metal, wet strength paper particularly if sized with plastic, etc. Also in each form illustrated to permit easy cleaning the several layers are releasably held or clamped together at their minimum spacing as by bolt and nut 17 and 18 of Fig. 1, but this also is not essential to the broader aspects of this invention wherein the several layers may be cemented or otherwise permanently secured together.

It will also be noted that in each form as shown the contacting angular portions are of uniform slope or angle to give substantial or appreciable inclined areas to be in alignment and contact to thus form in effect straight supporting columns of sufficient cross sectional area for proper strength of the filter unit. These columns need not be straight and in addition the areas in contact may be reduced so that the contacting angular portions are lines or points or little more than lines or points. This will space the layers and may be preferred in some cases although the stack can not be as tightly compressed without deflection of the spacing deformations. Such a form would be had if the conical portions 23 of Fig. 2 or 41 of Fig. 8 were surfaces of revolution or dimples with non-straight side walls giving a circular or ring-like contact line or nearly a line.

In all forms, the filtering may be in the several ways well known in the art, such as flow from the inside, or flow from the outside, or flow two ways from the inside and the outside to openings such as 64 of Fig. 10.

Although only certain specific embodiments of the invention have been described in detail, it will be appreciated by those skilled in this or in related arts that various modifications in the form, number, and arrangement of the parts may be made and the present spacing means employed to advantage in various other arrangements, all within the teachings and spirit of the present invention as defined in the accompanying claims.

I claim:

1. A filter of the edge filtering type comprising a plurality of substantially identical elements arranged in a stack, each element having a flat ring-shaped outer portion, a flat ring shaped inner portion co-axial with said outer portion, and lying in a plane parallel to but offset from the plane of said outer portion, and a plurality of intermediate portions connecting said inner and outer portions and lying on the surface of a cone co-axial with said inner and outer portions, all of said portions having substantially the same thickness and said intermediate portions being in contact with similar portions of adjacent elements so that said inner and outer portions are held spaced slightly away from the inner and outer portions of said adjacent elements to form thin passages between said inner portions and between said outer portions, and said intermediate portions of said element being spaced apart circumferentially to leave passages connecting said thin passages.

2. A filter of the edge filtering type comprising a plurality of substantially identical elements arranged in a stack, each element having two flat main portions of substantially uniform thickness lying in parallel planes spaced from each other, and a plurality of spaced connecting portions extending from one main portion to the other at an oblique angle to said parallel planes, said connecting portions being in contact with similar portions of adjacent elements and the thickness of said connecting portions being greater than the product of the thickness of said main portions multiplied by the cosine of said oblique angle so that said main portions are spaced slightly from the main portions of said adjacent elements to form thin passages between said main portions of said elements.

3. A metal-edge filter comprising a stack of identical thin metal plates having holes lined up to form passages through the plates to the end of the stack, the plates being spaced apart over a large part of their area to provide thin slits leading from the side of the stack to the passages formed by the holes, each of the identical plates having a flat main portion and a plurality of spacing portions, each spacing portion extending from the flat main portion at an oblique angle to the plane of the flat main portion towards the edge of a hole in the plate, the edge of the hole being out of the plane of the flat main portion of the plate.

4. In a filter of the edge filtering type, superimposed layers of sheet material of uniform thickness, portions of which are spaced apart from each other to form filtering slots between the edges of adjacent layers of the material, the spaced apart portions of the layers being parallel to each other, a spacing zone adjacent to the spaced apart portions comprising other portions of the layers bent at an angle to the spaced apart portions, the spacing portions of adjacent layers being in contact with each other, the spacing zone of each layer being interrupted by holes large enough to extend beyond the spacing zone in both directions normal to the filtering edges.

MAURICE B. HEFTLER.

REFERENCES CITED

The following references are of record in the file of this patent:

UNITED STATES PATENTS

| Number | Name | Date |
|---|---|---|
| 361,903 | Sperry | Apr. 26, 1887 |
| 893,070 | Gobbi | July 14, 1908 |
| 1,066,359 | Adams | July 1, 1913 |
| 1,111,471 | Krause | Sept. 22, 1914 |
| 1,472,676 | Rhoads | Oct. 30, 1923 |
| 1,570,725 | Benckenstein | Jan. 26, 1926 |
| 1,992,101 | Stuart | Feb. 19, 1935 |
| 2,066,793 | Mesurac | Jan. 5, 1937 |
| 2,137,556 | Young | Nov. 22, 1938 |
| 2,352,684 | Braddock | July 4, 1944 |

FOREIGN PATENTS

| Number | Country | Date |
|---|---|---|
| 334,569 | Great Britain | Sept. 8, 1930 |
| 523,919 | Great Britain | July 25, 1940 |
| 693,349 | Germany | July 6, 1940 |